United States Patent
Macri et al.

(10) Patent No.: US 8,478,478 B2
(45) Date of Patent: Jul. 2, 2013

(54) PROCESSOR SYSTEM AND FAULT MANAGING UNIT THEREOF

(75) Inventors: Umberto Macri, Munich (DE); Alberto Ferrari, Rome (IT); Massimo Baleani, Monte San Vito (IT); Antonio Anastasio, Villaricca (IT)

(73) Assignees: STMicroelectronics S.r.l., Agrate Brianza (IT); Parades S.c.a.r.l., Rome (IT)

( * ) Notice: Subject to any disclaimer, the term of this patent is extended or adjusted under 35 U.S.C. 154(b) by 1006 days.

(21) Appl. No.: 12/533,441

(22) Filed: Jul. 31, 2009

(65) Prior Publication Data

US 2011/0029191 A1  Feb. 3, 2011

(51) Int. Cl.
*G01M 17/00* (2006.01)
(52) U.S. Cl.
USPC .............................. 701/29.7; 700/3
(58) Field of Classification Search
USPC ........... 700/2, 3, 19, 79; 701/36, 29.7; 714/10
See application file for complete search history.

(56) References Cited

U.S. PATENT DOCUMENTS

| | | | |
|---|---|---|---|
| 5,862,502 A | 1/1999 | Giers | |
| 6,502,019 B1 | 12/2002 | Zydek et al. | |
| 6,704,628 B1 | 3/2004 | Fennel et al. | |
| 6,823,251 B1 | 11/2004 | Giers | |
| 6,981,176 B2 * | 12/2005 | Fruehling et al. | 714/11 |
| 7,620,465 B2 * | 11/2009 | Degoul et al. | 700/82 |
| 2001/0045941 A1 | 11/2001 | Rosenberg et al. | 345/161 |
| 2006/0176059 A1 | 8/2006 | Mir et al. | 324/503 |
| 2007/0073908 A1 | 3/2007 | Gormley | 710/8 |

FOREIGN PATENT DOCUMENTS

EP  0731937 B1  7/1998

* cited by examiner

*Primary Examiner* — Mark Hellner
(74) *Attorney, Agent, or Firm* — Seed IP Law Group PLLC

(57) ABSTRACT

A processor system having a processor core, a plurality of modules connected to the processor core and configured to generate respective fault signals, and a fault managing unit connected to the processor core and to the plurality of modules. The fault managing unit is adapted to collect a first fault signal generated by a first module of the plurality of modules which is in a fault condition, analyze said collected first fault signal, and generate a first reaction signal to be selectively transmitted to said processor core and said first module.

30 Claims, 3 Drawing Sheets

PROCESSOR SYSTEM AND FAULT MANAGING UNIT THEREOF

BACKGROUND

1. Technical Field

The present disclosure relates to the managing of faults in processor systems and more particularly relates to processor systems which can be employed in the automotive field.

2. Description of the Related Art

The subject of safety-critical automotive systems is growing in importance. Safety has become an integral and essential part behind the engineering process for modern vehicles. Vehicle safety is a wide-ranging discipline covering many engineering activities spanning materials, ergonomics, environmental, functional and so forth. Functional safety refers to aspects of the overall safety of a vehicle that rely on the vehicle sub-systems producing correct outputs or operating correctly in response to stimuli.

U.S. Pat. No. 6,502,019 describes an electronic digital device for controlling or adjusting processes in a motor vehicle including a CPU, a redundant CPU and a monitor device that compares data provided by the CPU and the redundant CPU. U.S. Pat. No. 6,704,628 describes a method of error detection of a microprocessor in a control unit of an automotive vehicle. European patent document EP 0 731 937 discloses a circuit for safety-critical control systems utilizing two or more CPUs. U.S. Pat. No. 6,823,251 illustrates a microprocessor for safety-critical control systems having three central units executing the same program so as to ensure that, upon failure, an emergency operation function is maintained.

BRIEF SUMMARY

The techniques of the above-referenced documents do not provide a satisfying reduction of the time needed to recover the fault situation and they require redundant components.

According to an embodiment, a processor system is provided that includes a processor core; a plurality of modules connected to the processor core and configured to generate respective fault signals; and a fault managing unit connected to the processor core and to the plurality of modules; the fault managing unit adapted to collect a first fault signal generated by a first module of the plurality of modules which is in a fault condition; analyze said collected first fault signal; and generate a first reaction signal to be selectively transmitted to said processor core and said first module.

According to another embodiment an electrical system is provided that includes a processor core, a plurality of modules connected to the processor core and configured to generate respective fault signals; and an automotive apparatus controlled by said processor core; and a fault managing unit configured to collect a fault signal generated by one module of the plurality of modules which is in a fault condition; analyze said collected fault signal; and generate a reaction signal to be selectively transmitted to said processor core and said module in fault condition.

An embodiment of a managing unit is defined to include an input module connectable to a core processor and to a plurality of operative modules; the input module configured to receive fault signals generated by the plurality of modules; a diagnosis and reaction module structured to analyze a fault signal received from one of said modules that is in a fault condition and to generate a reaction signal to be selectively sent to the processor core and the module in the fault condition in accordance with a criticality data associated with the fault signal; an output module connected to the diagnosis and reaction module to selectively transmit the first reaction signal to the core processor and to the module in the fault condition.

These and other aspects will be apparent from and elucidated with reference to the embodiments described hereinafter.

BRIEF DESCRIPTION OF THE SEVERAL VIEWS OF THE DRAWINGS

Further characteristics and advantages will be more apparent from the following description of a preferred embodiment and of its alternatives given as an example with reference to the enclosed drawings in which.

DETAILED DESCRIPTION

Figure 1:
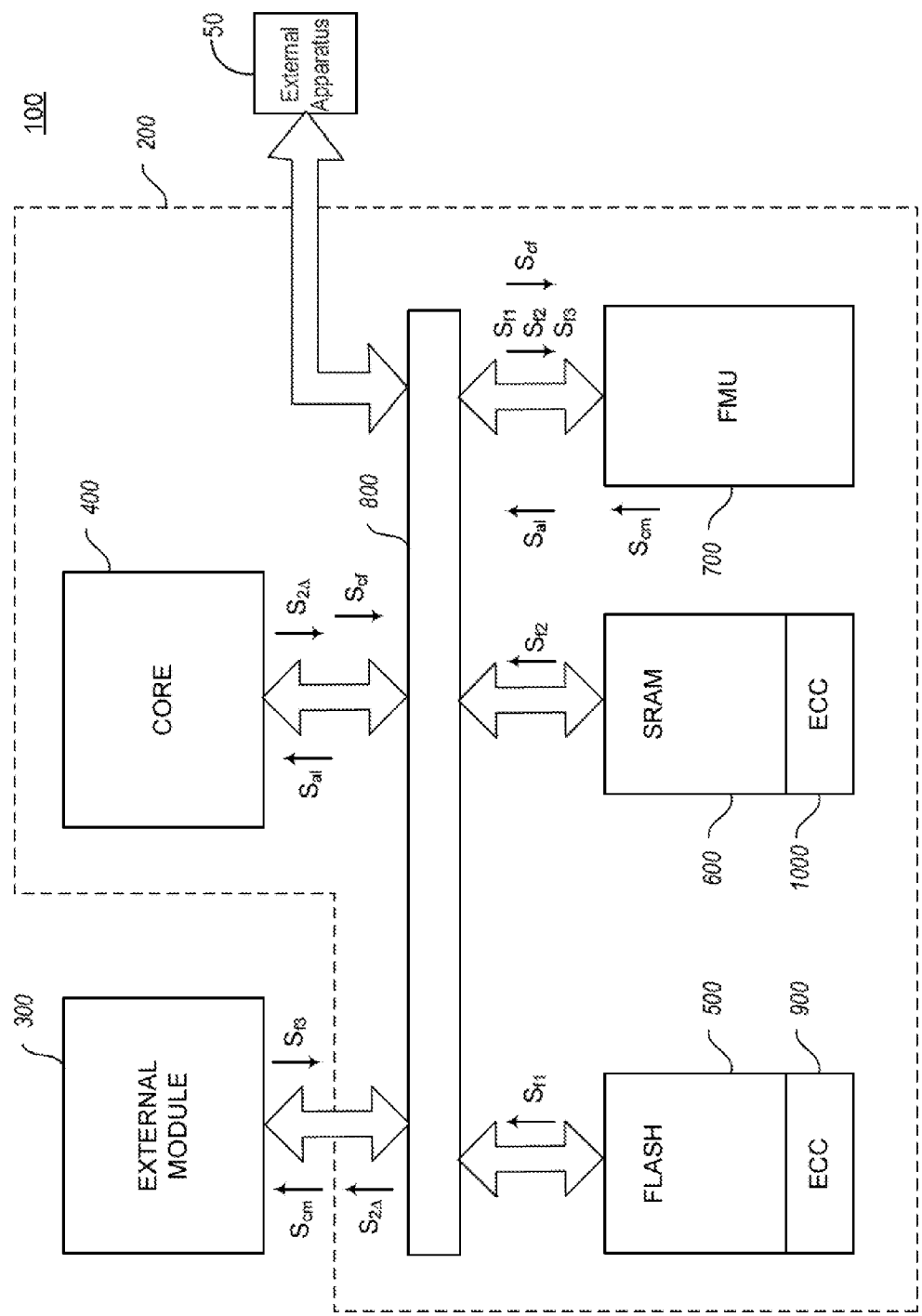
FIG. 1 schematically illustrates an electrical system utilizing a processor system provided with a fault managing unit in accordance with the present disclosure.

FIG. 1 schematically shows an electrical system 100 having a processor system 200 and, particularly, at least one external module 300 to be controlled by the processor system 200. The processor system 200 includes a processor core 400 configured to control the external module 300 in accordance with a control algorithm, and at least one internal module, such as, for instance, a first internal module 500 (hereinafter called "first module") and a second internal module 600 (hereinafter called "second module"). The processor system 200 is also provided with a fault managing unit 700 (FMU).

As an example, the electrical system 100 can be a microcontroller employed in automotive applications such as to control an external apparatus 50 e.g., an electrical motor or an air bag system. The electrical system 100 or the processor system 200 or both can include further modules and can be integrated in a semiconductor chip.

The processor core 400 is configured to control both first 500 and second modules 600 and is interconnected to the above mentioned modules 300, 500 and 600 and to the fault managing unit 700 by a data bus or instruction bus or combined data and instruction bus 800, which can include a crossbar switch (not shown). Particularly, the processor core 400 is a CPU (Central Processing Unit) provided with, as an example, an integer execution unit, a multiply unit, an instruction unit and suitable registers (not shown).

The first module 500, the second module 600 and the external module 300, individually or in any combination, are structured to generate a corresponding fault signal when a fault condition is detected. As an example, the first module 500 is a memory, particularly, a flash data memory provided with a first correction module 900 configured to implement an error correction code (ECC). The first correction module 900 is adapted to generate a first fault signal $S_{f1}$ indicating that an error has been detected in digital data to be stored in the flash data memory 500. As an example, the second module 600 is an SRAM (Static Random Access Memory) memory provided with a second correction module 1000 configured to implement a respective error correction code (ECC), such as a by means of a Built-In Self Test. The second correction module 1000 is adapted to generate a second fault signal $S_{f2}$ indicating that an error has been detected in a digital data (typically, a digital word) to be stored in the SRAM memory 600.

The external module 300 can be, as an example, a digital word comparator that is adapted to provide a third fault signal $S_{f3}$ when a difference between two compared digital word is detected in order to monitor the correct operation of some of the components of the electrical system 100. In accordance with another example, the external module 300 can be a voltage power monitor that performs checks of the values of a voltage to be supplied to the electrical system 200 or a clock monitor.

Particularly, the fault managing unit 700 is configured to manage fault conditions generated by random errors, such as random software errors (e.g., errors detected by a core self test or a peripheral test performed by the CPU 400) or random hardware errors (e.g., errors detected by the first correction module 900).

Figure 2:
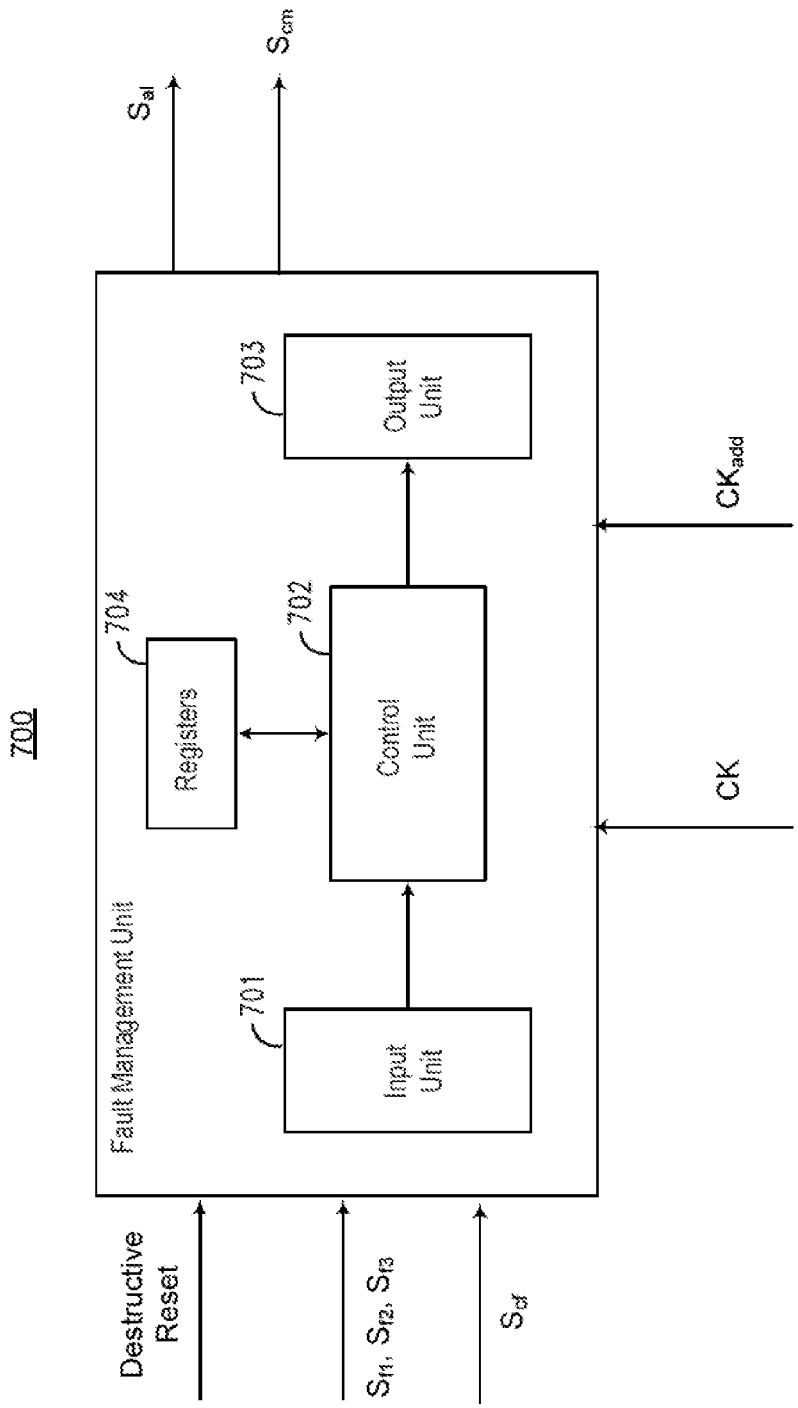
FIG. 2 shows an embodiment of a fault managing unit employable by the processor system.

The fault managing unit 700 is adapted to collect the first, second and third fault signals $S_{f1}$, $S_{f2}$ and $S_{f3}$ generated by the first module 500, the second module 600 and the external module 300, respectively. Moreover, the fault managing unit is structured to analyze each collected fault signal and generate a corresponding reaction signal to be transmitted to the CPU 400 or to one of the modules which has sent the analyzed fault signal. Reference is now made to FIG. 2 showing an example of the structure of the fault managing unit 700 illustrated by functional blocks. The fault managing unit 700 includes an input unit 701, a control unit 702, an output unit 703 and a register block 704.

The input unit 701 is structured to receive the first, second and third fault signals $S_{f1}$, $S_{f2}$ and $S_{f3}$ and other signals, as an example generated by the CPU 400, that reach the fault managing unit 700 by means of the bus 800. According to an embodiment, the control unit 702 is a finite state machine and is structured to analyze the received signals and implement a fault condition managing strategy. Particularly, the control unit 702 is synchronized by a system clock signal CK and receives an additional clock signal $CK_{add}$. The output unit 703 is configured to generate and send on the bus 800 reaction signals in accordance with the strategy of the control unit 702. The signals exchange between the fault managing unit 700 and the CPU 400, the external module 300, the first module 500 and the second module 600 can be performed in accordance with an Internet Protocol (IP).

The fault managing unit 700 is also provided with a register block 704 including a plurality of registers and, particularly, including a fault flag register containing a latched fault indication coming from the other modules of the electrical system 100 and a module configuration register containing an information indicating whether the fault managing unit 700 is in a test configuration or in a normal behavior state.

Particularly, each or only some of the first, second and third fault signals $S_{f1}$-$S_{f3}$ can carry a respective data indicating that the corresponding fault condition is of a first type or, alternatively, it is of a second type which is more critical than the one associated with the first type in accordance with a pre-established classification of fault criticality. The fault managing unit 700 is adapted to recognize from the received fault signal whether the fault condition is less or more critical and generate a different typology of reaction signal. According to the result of the analysis made on the received fault signal, the fault managing unit 700 can generate an alarm signal $S_{al}$ to be transmitted to the CPU 400 or a command signal $S_{cm}$ to be transmitted to one of the modules which is in the fault condition.

According to a possible configuration of the fault managing unit 700 an alarm signal $S_{al}$ is generated when a less critical fault condition is detected. In this situation the alarm signal $S_{al}$ is sent to the CPU 400, which acts consequently to recover the fault condition. As an example, if the external module 300 is in a less critical fault condition, the fault managing unit sends to the CPU 400 an alarm signal $S_{al}$, which is an interrupt request, and the CPU 400 sends to the external module 300 a reset signal $S_{rs}$ that causes a reset of the external module 300 in order to recover the fault condition. In an alternative situation, the external module 300 is in a more critical fault condition and the fault managing unit 700 generates and sends a command signal $S_{cm}$ directly to the external module 300 in order to overcome the fault condition without involving the CPU 400 and, therefore, saving time.

Figure 3:
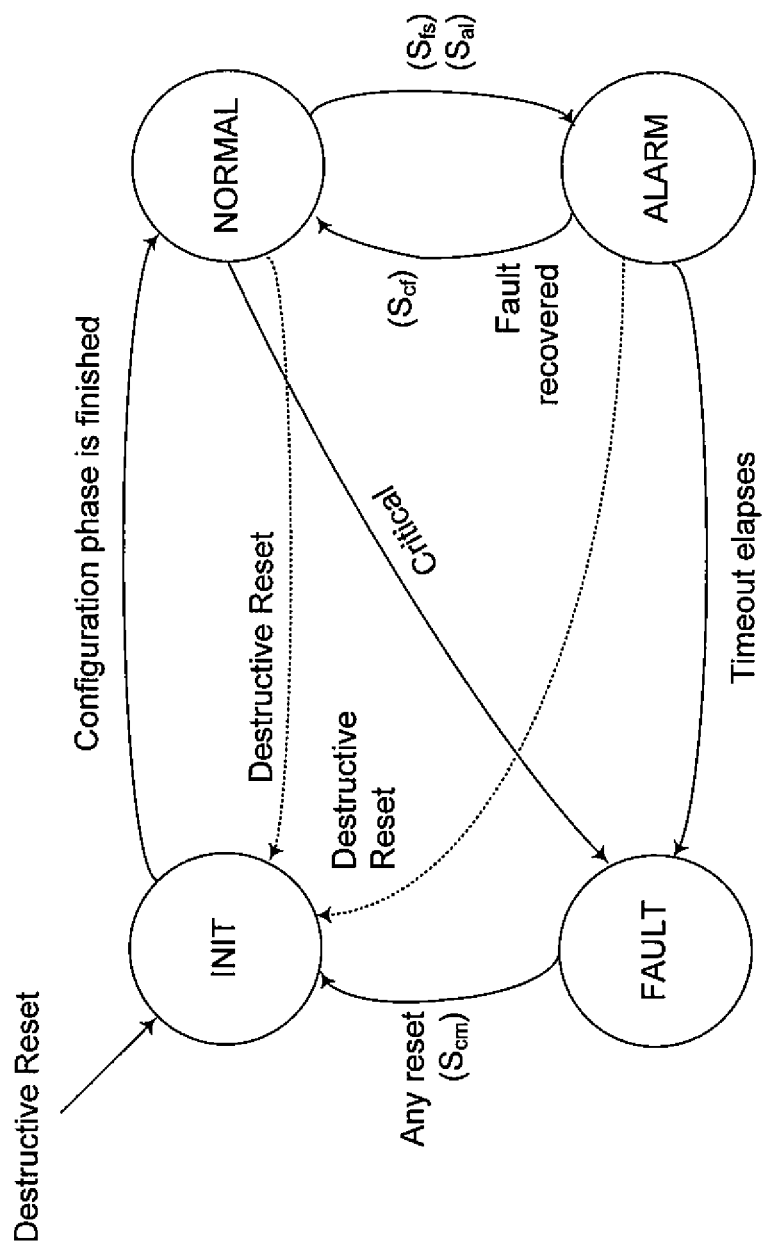
FIG. 3 is a diagram illustrating an embodiment of an operative model of the fault managing unit.

FIG. 3 shows a state diagram illustrating the operation of the fault managing unit 700 according to a particular embodiment wherein the fault managing unit 700 is configured as a state machine assuming four states: an initial state INIT, a normal state NORMAL, an alarm state ALARM and a fault state FAULT.

In accordance with this embodiment, the initial state INIT is assumed when a configuration signal is received at the fault managing unit 700, which starts a configuration phase. As an example, the configuration signal may be an assertion of a destructive reset signal transmitted by the CPU 400 and received at the fault managing unit 700. A destructive reset is a reset of all the devices and modules included in the electrical system 100. A destructive reset signal can be generated by the CPU 400 or by another module (e.g., using an IP protocol) dedicated to this task.

Once the configuration phase is finished, the fault managing unit 700 enters the normal state NORMAL in which it waits for one fault signal. Then, a fault is detected by the first correction module 900 of the first module 500 which generates the first fault signal $S_{f1}$. The first fault signal $S_{f1}$ is sent on the bus 800 and received by the input module 701 of the fault managing unit 700. According to this example, the first fault signal $S_{f1}$ carries data indicating that the error detected by the first correction module 900 is of a less critical type.

The control unit 702, which is connected to the input unit 701, detects the fault situation, recognizes that the fault is less critical and sends via bus 800 the alarm signal $S_{al}$ to the CPU 400 requesting the CPU 400 to perform an interrupt procedure. Consequently, the fault managing unit 700 assumes the alarm state ALARM and waits for a confirmation signal $S_{cf}$ sent from the CPU 400. The analysis of the received first fault signal $S_{f1}$ performed in order to recognize the type of the fault condition lasts a detection time $T_{detection}$, which is computed for each received fault signal by a time counter included in the control unit 702 of the fault managing unit 700.

The CPU 400 receives the alarm signal $S_{al}$ and reads state registers describing the fault situation and tries to react in order to recover the fault situation. As an example, the CPU 400 successfully recovers the fault situation occurred at the first module 500 and sends the confirmation signal $S_{cf}$ to the fault managing unit 700. According to this example, the CPU 400 performs this recover operation in a fault-reaction time $T_{fault-reaction}$.

Moreover, the fault managing unit 700 remains in the alarm state until the confirmation signal $S_{cf}$ is received or a timeout $T_L$ elapses. If the confirmation signal $S_{cf}$ is received before the expiring of the timeout $T_L$, the fault managing unit 701 returns to the normal state NORMAL (transition "Fault recovered" in FIG. 3). On the contrary, if the time counter of the control unit 702 indicates that the fault managing unit 700 is in the alarm state ALARM for a time equal to the time limit $T_L$ and no confirmation signal $S_{cf}$ has been received, the fault managing unit 700 performs a transition towards the fault state FAULT (transition "Timeout elapses" in FIG. 3). As an example, the time out $T_L$ is counted basing on the additional clock signal $CK_{add}$ having a frequency lower than the one of the system clock signal CK. As an example, the additional clock signal $CK_{add}$ can have a frequency one hundred times lower than the frequency of the system clock signal CK.

It is observed that the fault state FAULT can be also assumed by a direct transition from the normal state NORMAL, in the case in that in the normal state the fault managing unit 700 receives the first fault signal $S_{f1}$ (or another fault signal) indicating a condition of more critical fault (i.e., transition "critical"). In the fault state the fault managing unit 700 performs a reaction in order to recover the fault situation independently from the CPU 400. In accordance with the example made, the control unit 701 generates a reaction signal and the output unit 703 generates the command signal $S_{cm}$ (i.e., a reset signal) which reaches the first module 500 and causes a reset of the first module 500. According to the described embodiment, no time counting is performed in the fault state FAULT.

Consequently to the generation of the command signal or to any other type of reset (including a destructive reset), the fault managing unit 700 performs a transition towards the initial state INIT. It is also observed that starting from any states assumed by the fault managing unit 700, the latter performs a transition towards the initial state INIT when a destructive reset occurs.

Particularly, the control unit 701 is configured to guarantee that the time needed for the detection of a fault $T_{detection}$ summed to the time needed for the reaction $T_{fault-reaction}$ is low enough to avoid any failure in the system i.e.:

$$T_{detection} + T_{fault-reaction} \leq T_{Process-Safety}$$

The time $T_{Process-Safety}$ is a pre-established and, particularly, re-configurable, safety time. The time needed for the reaction $T_{fault-reaction}$ includes the time needed in the situation in which the fault is recovered from the alarm state ALARM or the situation in which the fault is recovered from the fault state FAULT or both.

The embodiments described above facilitate managing of the fault conditions of internal or external or both internal and external modules of a processor system in a particularly effective manner, with time saving, and without causing an overload of the processor core. Moreover, the manufacture of the processor system, including the described fault managing unit is not particularly difficult. The increased safety obtainable by the above described embodiments meets the strict requirements typical of automotive applications. However, other modifications, variations and alternatives are also possible. As an example, the fault managing unit 700 can be configured to perform periodic tests, i.e., the analysis of the received fault signals is scheduled periodically, e.g., every 10 ms without any overhand for the CPU 400. Alternatively, the analysis of the received fault signals is not scheduled in a periodic manner, but it is performed at the reception of each generated fault signal.

The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processor system, comprising:
    a processor core;
    a plurality of modules coupled to the processor core and configured to generate respective fault signals, the plurality of modules including a first module configured to generate a first fault signal and a second module configured to generate a second fault signal; and
    a fault managing unit coupled to the processor core and to the plurality of modules,
    the fault managing unit including:
        an input module configured to receive the first and second fault signals generated by the second module of the plurality of modules; and
        a diagnosis and reaction module configured to analyze the first fault signal and the second fault signal, generate a first reaction signal and a second reaction signal, and selectively transmit the first and second reaction signals to the processor core and the first module.

2. The system of claim 1, further comprising:
    a bus interconnecting the fault managing unit, the processor core, and the plurality of modules to exchange the first fault signal, the second fault signal, the first reaction signal, and the second reaction signal.

3. The system of claim 2 wherein the fault managing unit further comprises:
    an output module coupled to the diagnosis and reaction module and configured to transmit the first reaction signal and the at least a second reaction signal on the bus.

4. The system of claim 1 wherein the diagnosis and reaction module is configured to:

generate an alarm signal as the first reaction signal and transmit the alarm signal to the processor core, which is configured to recover the first module from a fault condition; and generate a command signal as the first reaction signal and transmit the command signal to the first module, which is configured to recover the first module from a fault condition.

5. The system of claim 4 wherein the first fault signal is configured to selectively represent a first fault condition and a second fault condition; the fault managing unit configured to generate the alarm signal when the first fault signal represents the first fault condition and to generate the command signal when the first fault signal represents the second fault condition.

6. The system of claim 5 wherein the fault managing unit is configured to assume an alarm state when the alarm signal is generated, and the core processor is configured to generate a safety signal in response to a recovery from the fault condition, the fault managing unit configured to receive the safety signal.

7. The system of claim 6 wherein the fault managing unit is configured to transition from the alarm state to a fault state and to generate the command signal in response to receipt of the safety signal for a time equal or greater than a waiting time.

8. The system of claim 1 wherein the fault managing unit is a finite state machine.

9. The system of claim 1 wherein the managing unit is configured to receive and manage fault signals due to at least one of the following errors: a random error; a random hardware error, and a random software error.

10. The system of claim 1 wherein the first module is at least one of the following modules: a memory error detection module, a digital word comparator, a power voltage monitor, and a clock monitor.

11. The system of claim 4 wherein the fault managing unit is configured to:
generate the alarm signal as an interrupt signal that is configured to request the processor core to reset the first module; and
generate the command signal as a reset signal and directly send the reset signal to the first module.

12. The system of claim 7 wherein the fault managing unit is configured to further transition to:
an initial state in response to receipt of a destructive reset signal; and
a normal state in which the fault managing unit is configured to wait for one further fault signal.

13. The system of claim 1 wherein the system comprises a microcontroller integrated on a semiconductor chip.

14. A system, comprising
a processor core,
a plurality of modules coupled to the processor core and configured to generate respective fault signals, the plurality of modules including a first module configured to generate a first fault signal when in a fault condition;
an automotive apparatus configured to be controlled by said processor core; and
a fault managing unit configured to:
receive the first fault signal;
analyze the first fault signal;
generate a first reaction signal that includes at least one of an alarm signal and a command signal;
if the first reaction signal includes the alarm signal, selectively transmit the alarm signal to said processor core and cause the processor core to recover the first module from the fault condition; and
if the first reaction signal includes the command signal, selectively transmit the command signal to said first module and cause the first module to recover from the fault condition.

15. The system of claim 14 wherein the fault managing unit comprises:
an input module configured to receive a first fault signal generated by the first module and at least a second fault signal generated by at least a second module of the plurality of modules; and
a diagnosis and reaction module configured to analyze the first fault signal and the at least second fault signal and generate a first reaction signal and at least one second reaction signal.

16. The system of claim 14, wherein:
the first module is configured to selectively generate said first fault signal with a first indication that represents a first fault condition and with a second indication that represents a second fault condition that is more critical than the first fault condition; and
the fault managing unit is configured to generate the alarm signal in response to determining that the first fault signal includes the first indication that represents the first fault condition and to generate the command signal in response to determining that the first fault signal includes the second indication that represents the second fault condition.

17. A circuit, comprising:
an input module configured to be coupled to a core processor and to a plurality of operative modules including a first module configured to generate a first fault signal representing either a first fault condition or a second fault condition that is more critical than the first fault condition; the input module configured to receive the first fault signal;
a diagnosis and reaction module configured to analyze the first fault signal and to generate a first reaction signal having a criticality indicator that depends on whether the first fault signal represents the first fault condition or the second fault condition; and
an output module coupled to the diagnosis and reaction module and configured to receive the first reaction signal and to selectively transmit the first reaction signal to the core processor and to the first module in accordance with the criticality data wherein:
the circuit is configured to generate an alarm signal when the first fault signal represents the first fault condition and to generate a command signal when the fault signal represents the second fault condition.

18. The system of claim 17 wherein the circuit is configured to transition to an alarm state in which the alarm signal is generated, and the core processor configured to generate a safety signal in response to receiving an indication that the first module has recovered from one of the first and second fault conditions.

19. The system of claim 18 wherein the circuit is configured to transition from the alarm state to a fault state and to generate the command signal in response to receiving the safety signal for a time equal to or greater than a waiting time.

20. The system of claim 17 wherein the circuit comprises a finite state machine.

21. A processor system, comprising:
a processor core;
a plurality of modules coupled to the processor core and configured to generate respective fault signals, the plurality of modules including a first module configured to generate a first fault signal and a second module configured to generate a second fault signal; and a fault managing unit coupled to the processor core and to the plurality of modules, the fault managing unit configured to:

receive the first fault signal;

analyze the received first fault signal; and generate a first reaction signal to be selectively transmitted to said processor core and the first module, the first reaction signal includes one of the following signals:

an alarm signal transmitted to the processor core, which is configured to recover the first module from a fault condition;

a command signal transmitted to the first module and configured to recover the first module from a fault condition.

22. The system of claim 21 wherein the first fault signal is configured to selectively represent a first fault condition and a second fault condition; the fault managing unit configured to generate the alarm signal when the first fault signal represents the first fault condition and to generate the command signal when the first fault signal represents the second fault condition.

23. The system of claim 22 wherein the fault managing unit is configured to assume an alarm state when the alarm signal is generated, and the core processor is configured to generate a safety signal in response to a recovery from the fault condition, the fault managing unit configured to receive the safety signal.

24. The system of claim 23 wherein the fault managing unit is configured to transition from the alarm state to a fault state and to generate the command signal in response to receipt of the safety signal for a time equal or greater than a waiting time.

25. A system, comprising a processor core, a plurality of modules coupled to the processor core and configured to generate respective fault signals, the plurality of modules including a first module configured to generate a first fault signal and a second module configured to generate a second fault signal;

an automotive apparatus configured to be controlled by the processor core; and a fault managing unit configured to:

receive the first fault signal generated by the first module when in a fault condition;

analyze the received first fault signal; and generate a first reaction signal in response to the analyzing the received first fault signal, the reaction signal configured to be selectively transmitted to the processor core and to the first module that is in the fault condition, the fault managing unit comprises:

an input module configured to receive the first fault signal and at least the second fault signal generated by the second module of the plurality of modules; and a diagnosis and reaction module configured to analyze the first fault signal and the second fault signal and generate a first reaction signal and at least one second reaction signal.

26. The system of claim 25 wherein the first reaction signal includes at least one of the following signals:

an alarm signal configured to cause the first module to recover from the fault condition;

a command signal configured to cause the first module to recover from the fault condition.

27. The system of claim 25 wherein the first fault signal is configured to selectively represent a first fault condition and a second fault condition that is more critical than the first fault condition; the fault managing unit configured to generate the alarm signal when the first fault signal represents the first fault condition and to generate the command signal when the first fault signal represents the second fault condition.

28. A circuit, comprising:

a core processor;

a plurality of operative modules including a first module and a second module that are each configured to generate first and second fault signals, respectively, which selectively represent respectively a first fault condition and a second fault condition that is more critical than the first fault condition, an input module configured to be coupled to a core processor and to the input module and configured to receive fault signals generated by the plurality of operative modules, including the first and second fault signals;

a diagnosis and reaction module configured to analyze the first fault signal received from the first module when the first module is in a fault condition and to generate a first reaction signal having a criticality data associated therewith;

an output module coupled to the diagnosis and reaction module and configured to receive the first reaction signal and to selectively transmit the first reaction signal to the core processor and to the first module in the fault condition in accordance with the criticality data; and the circuit configured to generate an alarm signal when the first fault signal represents the first fault condition and to generate a command signal when the fault signal represents the second fault condition, the circuit configured to transition to an alarm state in which the alarm signal is generated, and the core processor configured to generate a safety signal in response to the first module recovering from the fault condition.

29. The system of claim 28 wherein the circuit is configured to transition from the alarm state to a fault state and to generate the command signal in response to a receipt of the safety signal for a time equal to or greater than a waiting time.

30. The system of claim 28 wherein the circuit comprises a finite state machine.

* * * * *